(12) United States Patent
    Yallamraju et al.

(10) Patent No.: US 9,870,289 B2
(45) Date of Patent: Jan. 16, 2018

(54) NOTIFYING A BACKUP APPLICATION OF A BACKUP KEY CHANGE

(71) Applicant: CA, INC., New York, NY (US)

(72) Inventors: Umasankar Yallamraju, Hyderabad (IN); Subrahmanya Sarma Yellapragada, Hyderabad (IN); Vijaya Kumar Pothireddy, Hyderabad (IN); Ramakrishna Maddali, Hyderabad (IN)

(73) Assignee: CA, INC., New York, NY (US)

( * ) Notice: Subject to any disclaimer, the term of this patent is extended or adjusted under 35 U.S.C. 154(b) by 46 days.

(21) Appl. No.: 14/575,557

(22) Filed: Dec. 18, 2014

(65) Prior Publication Data

US 2016/0170669 A1     Jun. 16, 2016

Related U.S. Application Data

(63) Continuation-in-part of application No. 14/569,327, filed on Dec. 12, 2014.

(51) Int. Cl.
    *G06F 12/00* (2006.01)
    *G06F 11/14* (2006.01)
    *G06F 11/00* (2006.01)
    *G06F 3/06* (2006.01)

(52) U.S. Cl.
    CPC ......... *G06F 11/1451* (2013.01); *G06F 11/00* (2013.01); *G06F 3/065* (2013.01); *G06F 3/0619* (2013.01)

(58) Field of Classification Search
    CPC ............ G06F 11/1451; G06F 11/1446; G06F 11/1448; G06F 11/1435; G06F 11/1464; G06F 11/1469; G06F 2201/84; G06F 3/0619; G06F 3/065; G06F 3/0683
    See application file for complete search history.

(56) References Cited

U.S. PATENT DOCUMENTS

| | | | | |
|---|---|---|---|---|
| 6,038,639 A * | 3/2000 | O'Brien | ............ | G06F 11/1435 711/114 |
| 6,061,770 A * | 5/2000 | Franklin | ............ | G06F 11/1466 711/161 |
| 6,367,029 B1 * | 4/2002 | Mayhead | ............ | G06F 11/1625 709/203 |
| 6,934,822 B2 * | 8/2005 | Armangau | .......... | G06F 11/1435 707/999.01 |
| 7,165,154 B2 * | 1/2007 | Coombs | ............ | G06F 11/1448 711/162 |
| 7,165,155 B1 * | 1/2007 | Duprey | ............... | G06F 11/1451 711/162 |

(Continued)

FOREIGN PATENT DOCUMENTS

WO      WO 2012085297 A1 *    6/2012    .......... G06F 11/1464

*Primary Examiner* — David X Yi
*Assistant Examiner* — Francisco Grullon
(74) *Attorney, Agent, or Firm* — Fabian VanCott; Steven Nichols

(57) ABSTRACT

A notifying system to notify a backup application of a backup key change includes receiving, from a backup application, a request to associate with a backup key, replicating the backup key to create a replica backup key, associating the replica backup key with the backup application, monitoring the backup key for a change, the change indicating a backup event has occurred, and setting the replica backup key to indicate the backup key has changed.

19 Claims, 7 Drawing Sheets

(56) References Cited

U.S. PATENT DOCUMENTS

| | | | |
|---|---|---|---|
| 7,237,075 B2 * | 6/2007 | Welsh | G06F 11/1451 711/159 |
| 7,770,059 B1 * | 8/2010 | Glade | G06F 11/0712 709/213 |
| 7,801,867 B2 * | 9/2010 | Mittal | G06F 11/1451 707/686 |
| 7,934,064 B1 * | 4/2011 | Per | G06F 11/1451 707/641 |
| 8,468,136 B2 * | 6/2013 | Ulrich | G06F 11/1451 707/610 |
| 8,495,023 B1 * | 7/2013 | Tsaur | G06F 11/1448 707/646 |
| 8,793,222 B1 * | 7/2014 | Stringham | G06F 17/30091 707/649 |
| 8,874,524 B1 * | 10/2014 | Zhao | G06F 17/30088 707/639 |
| 8,990,164 B1 * | 3/2015 | Mahajan | G06F 11/1451 707/649 |
| 9,122,711 B1 * | 9/2015 | Nicolini | G06F 17/30289 |
| 9,535,907 B1 | 1/2017 | Stringham | |
| 9,672,116 B1 * | 6/2017 | Chopra | G06F 11/1464 |
| 2003/0101321 A1 * | 5/2003 | Ohran | G06F 11/1451 711/162 |
| 2005/0015685 A1 * | 1/2005 | Yamamoto | G06F 11/0727 714/54 |
| 2005/0033777 A1 * | 2/2005 | Moraes | G06F 17/30575 |
| 2005/0278465 A1 * | 12/2005 | Qi | G06F 13/387 710/36 |
| 2006/0106893 A1 * | 5/2006 | Daniels | G06F 11/1435 |
| 2006/0218203 A1 * | 9/2006 | Yamato | G06F 11/2082 |
| 2010/0005259 A1 * | 1/2010 | Prahlad | G06F 11/1435 711/162 |
| 2010/0076934 A1 * | 3/2010 | Pershin | G06F 11/1451 707/640 |
| 2010/0077160 A1 * | 3/2010 | Liu | G06F 3/0482 711/162 |
| 2010/0280999 A1 * | 11/2010 | Atluri | G06F 11/1471 707/657 |
| 2011/0282843 A1 * | 11/2011 | Wang | G06F 11/1466 707/649 |
| 2012/0117342 A1 * | 5/2012 | Karonde | G06F 11/1451 711/162 |
| 2014/0078882 A1 * | 3/2014 | Maltz | H04L 41/0883 370/216 |
| 2014/0108717 A1 * | 4/2014 | Tian | G06F 3/0604 711/108 |
| 2016/0203061 A1 | 7/2016 | Lee | |

* cited by examiner

NOTIFYING A BACKUP APPLICATION OF A BACKUP KEY CHANGE

BACKGROUND

The present disclosure relates to supporting software backup applications, and more specifically, to supporting multiple software backup applications using a single change tracker.

A network includes a number of computing devices. The computing devices, such as data servers, store information on data storage devices. A backup server may back up the data stored on a computing device by utilizing a number of backup applications. Each of the backup applications determines changes that have been made to the data stored on other computing devices. The changes that have been made to the remote data are then made locally to the backup data.

BRIEF SUMMARY

According to one aspect of the present disclosure, a method is implemented by a backup server to notify a backup application of a backup key change; the method includes receiving, from a backup application, a request to associate with a backup key, replicating the backup key to create a replica backup key, associating the replica backup key with the backup application, monitoring the backup key for a change, the change indicating a backup event has occurred, and setting the replica backup key to indicate the backup key has changed.

According to one aspect of the present disclosure, a data backup system includes at least one backup application associated with a backup server that manages a backup data set stored on a backup data storage device, a supporting system comprising notifying the at least one backup application when an event occurs that affects a backup operation of the at least one backup application, and the least one backup application communicating with the at least one backup driver through the supporting system.

According to one aspect of the present disclosure, a computer program product notifies a backup application of a backup key change comprising a machine-readable storage medium encoded with instructors, the instructions executable by a processor of a system to cause the system to receive, from a backup application, a request to associate with a backup key tracker, replicate the backup key tracker to create a replica backup key tracker, associate the replica backup key tracker with the backup application, monitor the backup key tracker for a change, the change indicating a backup event has occurred, and set the replica backup key tracker to indicate the event has occurred, when the backup key tracker indicates an event has occurred.

BRIEF DESCRIPTION OF THE DRAWINGS

Aspects of the present disclosure are illustrated by way of example and are not limited by the accompanying figures, with like references indicating like elements.

Throughout the drawings, identical reference numbers designate similar, but not necessarily identical, elements.

DETAILED DESCRIPTION

Figure 1:
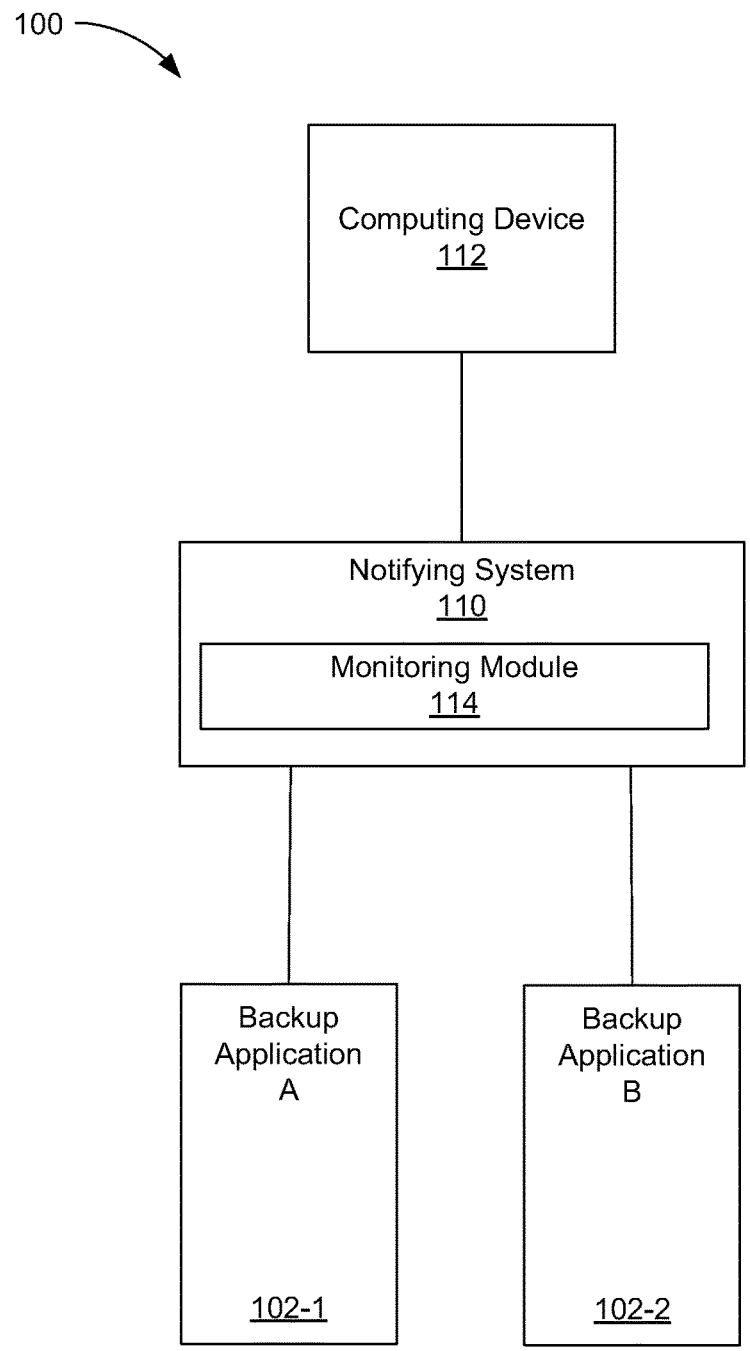
FIG. 1 illustrates a diagram of a system for supporting notifying a backup application of a backup key change, according to one example of the principles described herein.

The present specification describes a method and system to notify a backup application of a backup key change, such that each backup application may perform a backup operation based on the backup key change.

The present invention may be a system, a method, and/or a computer program product. The computer program product may include a computer readable storage medium (or media) having computer readable program instructions thereon, for causing a processor to carry out aspects of the present invention.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but is not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment, or offered as a service such as a Software as a Service (SaaS).

Aspects of the present disclosure are described herein with reference to flowchart illustrations and/or block diagrams of methods, apparatuses (systems) and computer program products, according to embodiments of the disclosure. It will be understood that each block of the flowchart illustrations and/or block diagrams, and each combination of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, can direct a computer, other programmable data processing apparatus, or other devices to function in a particular manner, such that the instructions, when stored in the computer readable medium, produce an article of manufacture including instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function, in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure, with various modifications as are suited to the particular use contemplated.

A backup server may back up a computing device using a number of backup applications. An event on the computing device, such as the failure of a hard disk device, may affect the backup operation for a number of backup applications. A backup application may monitor events by reading a backup driver, or by monitoring a system registry. These methods may create contention around global resources. These methods may allow an error in the backup application, backup server, or server to have negative effects on the backup process.

According to the principles described herein, a notifying system may support multiple backup applications, reducing the contention around global resources and preventing errors from affecting areas of a server's services. The notifying system may provide a common interface for backup applications to be notified of events affecting backup operations.

As used in the present specification and in the appended claims, the term "a number of" or similar language may include any positive number, including one to infinity; zero not being a number, but the absence of a number.

As used in the present specification and appended claims, the term "server" means a computer device that provides services to another device or system.

As used in the present specification and appended claims, a "backup server" is a server for which the primary purpose is to back up and store data that exists originally on some client computing device. The client computing device being backed up may be the same or a different computing device from the backup server. A backup server may back up a number of client computing devices.

As used in the present specification and appended claims, the term "change" means that data stored on a computing device has been modified. A change may indicate that the data has been added to, deleted, or set to a different value. When an original data set is changed, the same changes should be made in a corresponding backup data set so that the backup data set accurately records the state of the original data set.

As used in the present specification and appended claims, the term "backup" means a process for replicating data that is stored on a client computing device, so that another copy of that data exists and can be used if the original data set is lost or compromised. For example, a backup data set is used to reduce the risk of data loss in the event of a hardware or software failure on a server. In the event of such a failure, the backup data set is used to replace the lost or damaged data set.

As used in the present specification and appended claims, the term "full backup" represents a backup that includes a complete set of backup data.

As used in the present specification and appended claims, the term "backup event" means a system event that affects the backup of a data set. A backup client changes the backup action based on the occurrence of a backup event. Examples of a backup event include members of the set: system shutdown, system reboot, system power failure, hard disk failure, file system format, file system expansion, file system reduction, and the execution of a file system management command. A backup application performs a backup operation for each of the members of the set.

As used in the present specification and appended claims, the term "backup data" or "backup data set" means data which is a copy of another, original data set that has been replicated for archival purposes. The backup data may be used in the event of data loss in the original data set. The backup data may be stored and periodically updated by a backup application.

As used in the present specification and appended claims, the term "backup application" means an application that conducts a backup operation to create a backup data set from an original data set.

As used in the present specification and appended claims, the term "backup key" represents information related to backing up data. A backup key provides information to be used during a backup operation. In one example, a backup key may indicate that there is data to be backed up since a prior backup event. In another example, a backup key may indicate a full backup is to be performed.

As used in the present specification and appended claims, the term "backup driver" means an interface that supports and communicates with a backup application to back up data. A backup driver may track changes to an original data set.

Referring now to the figures, FIG. 1 is a diagram of a system for notifying a backup application of a backup key change, according to one example of the principles described herein. As will be described below, a notifying system receives, from a backup application, a request to associate with a backup key, the backup key being associated with a backup driver. The notifying system replicates the backup key to create a replica backup key. The notifying system associates the replica backup key with the backup application. The notifying system monitors the backup key for a change, the change indicating a backup event has occurred. The notifying system sets the replica backup key to indicate the change. The notifying system notifies the application when the replica backup key is set.

As illustrated in FIG. 1, the system (100) includes a computing device (112). As illustrated, the computing device (112) may be a file server. The computing device (112) stores data in a file system. The computing device (112) stores a number of files. The computing device (112) stores the data on a hard disk drive. As will be described below, the notifying system (110) supports notifying a backup application of changes on the computing device (112). The notifying system (110) includes a monitoring module (114).

The notifying system (110) receives, from a backup application, a request to associate with a backup key, the backup key being associated with a backup driver. The backup state represents the occurence of an event that affects the backup to be performed by the backup application. The backup application may send the notifying system (110) a request that includes indicating a number of backup events to notify the backup application of when the event occurs. The request may group a number of backup events to provide for a common action that the backup application may invoke. The notifying system (110) may receive a number of requests from a number of backup applications.

The notifying system (110) replicates the backup key to create a replica backup key. Backup applications may begin and complete backup transactions at different times. A replica backup key tracks the backup key for each backup application, allowing each backup application to monitor changes to the backup key. The notifying system (110) creates a replica backup key for each backup application that has requested to be associated with a particular backup key.

The notifying system (110) associates the replica backup key with the backup application. The association of the replica backup key with the application allows the replica backup key to be changed based on the activity of the key.

The notifying system (110) monitors the backup key for a change, the change indicating a backup event has occurred. A backup event, such as a hard disk failure, may affect a backup operation performed by the backup application. The backup application may invoke a course of action, such as performing a full back up or notifying a user of the backup event.

The notifying system (110) sets the replica backup key when the backup event occurs. By setting the replica backup key, the notifying system (110) may notify the backup application of the occurrence of the event.

Figure 2:
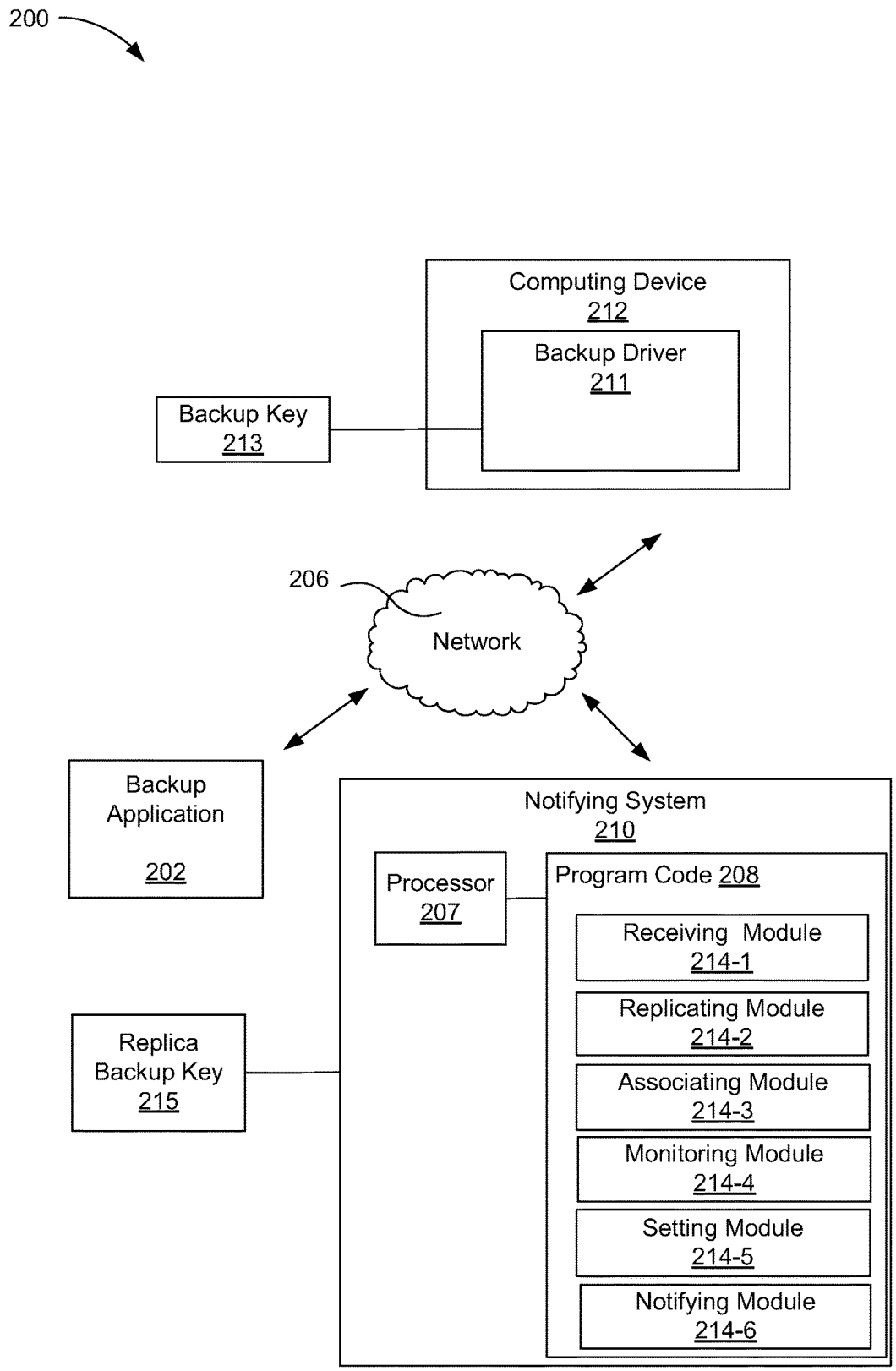
FIG. 2 illustrates a diagram of a system for notifying a backup application of a backup key change, according to one example of the principles described herein.

FIG. 2 is a diagram of a system for notifying a backup application of a backup key change, according to one example of the principles described herein. As will be described below, the notifying system is in communication with a computing device with data to back up. The notifying system receives, from a backup application, a request to associate with a backup key, the backup key being associated with a backup driver. The notifying system replicates the backup key to create a replica backup key for the requesting application. The notifying system associates the replica backup key with the backup application. The notifying system monitors the backup key for a change, the change indicating a backup event has occurred. When a change in the backup key occurs, the notifying system updates the replica backup key to indicate the change. The notifying system notifies the backup application when the replica backup key is updated.

As illustrated in FIG. 2, the system (200) includes a computing device (212). The computing device (212) may be a data storage server, an email server, or another system that has data associated with it. The computing device (212) may be a personal computer that is backed up. The computing device (212) represents a computer system that stores data that may be backed up. The computing device (212) may include a backup driver (211) to provide an interface to backup data stored on the computing device (212). The backup driver (211) may provide an interface to monitor changes in a backup key (213).

As illustrated, the system (200) includes a notifying system. The notifying system (210) contains a processor (207) and program code (208). The program code (208) contains a number of modules (214). The program code (208) is stored in memory and causes the processor (207) to execute the designated function of the module. As illustrated, the program code (208) includes a receiving module (214-1), a replicating module (214-2), an associating module (214-3), a monitoring module (214-4), a setting module (214-5), and a notifying module (214-6). As will be described below, the notifying system (210) may notify a backup application (202) of a change in a backup key (213).

As mentioned above, the notifying system (210) includes a receiving module (214-1) to receive, from a backup application, a request to associate with a backup key (213) associated with a backup driver (211). The backup driver (211) may be responsible for tracking changes to the system that affect the integrity of the backup. The backup key (213) represents data providing information about changes to the computing device that affect a backup. The notifying system (210) may reside on the computing device (212). The receiving module (214-1) receives, from a backup application, a request to associate with a backup key (213) with a backup driver (211). In one example, the receiving module (214-1) receives, through a network (206) from a backup application (202), a request to associate with a backup key (213) on a computing device (212). The backup key (213) may store a number of events that have occurred, or may track occurrences of events. In another example, the notifying system (210) resides on the computing device (212), and the receiving module (214-1) receives, from a process on the computing device (212), a request to associate with the backup key (213).

As illustrated, the notifying system (210) includes a receiving module (214-1) to receive, from a backup application (202), a request to associate with a backup key. The receiving module (214-1) may receive the request from a backup application (202) through a network (206). The notifying system (210) may reside on the backup application (202). The receiving module (214-1) receives the request as inter-process communication. The notifying system (210) may reside on the computing device (212). The receiving module (214-1) may receive from a number of different backup applications, a number of requests to associate each of the number of different backup applications with the backup key (213).

As illustrated, a replicating module (214-2) replicates the backup key to create a replica backup key. The replicating module (214-2) allocates memory and copies the backup key into a replica backup key. The notifying system (210) may provide functions to operate on the replica backup key in the same manner that a backup driver allows operations on the backup key. The replicating module (214-2) may create a number of replica backup keys.

An associating module (214-3) associates a replica backup key (213) with a backup application. The associating module (214-3) may associate a replica backup key with each of the number of backup applications. This association allows the notifying system (210) to monitor that each of the backup applications is notified of changes to the backup key. The association may be a logical association. The notifying system (210) may emulate the driver, allowing the backup applications (202) to reference the notifying system (210), to receive information, such as when the backup application (202) may have otherwise referenced the backup driver (211)

A monitoring module (214-4) monitors the backup key (213) associated with the backup driver (211) for a change, the change indicating that a backup event has occurred. The backup key (213) may be an integer value that is increased when an event occurs that requires a full backup. An event that requires a full backup may include a system shutdown, a system reboot, a system power failure, a hard disk failure, a file system format, a file system size reduction, or the execution of a file system management command. The monitoring module (214-4) may monitor the backup driver (211) for a change in the backup key (213).

A setting module (214-5) sets the replica backup key to indicate the change has occurred. The setting module (214-5) may copy the backup key (213) into the replica backup key (215). The setting module (214-5) may transform the backup key (213) and set the replica backup key to a transformed value.

A notifying module (214-6) notifies a backup application of a change to the backup key. The notification may include an action that is recommended to the backup application. The action may include notifying the backup application that the backup application is to check the backup key. The action may instruct the backup application to perform a full backup. The action may inform the backup application that all future backups will fail.

An overall example of FIG. 2 will now be described. A receiving module (214-1) in a notifying system (210) receives, from a backup application, a request to associate with a backup key (213) associated with a backup driver (211). The receiving module (210) invokes a replicating module (214-2) to replicate the backup key (213), to create a replica backup key (215). The notifying system (210) invokes an association module (214-3), to associate the replica backup key (215) with the backup application (202). The notifying system (210) invokes a monitoring module (214-4), to monitor the backup state (213) associated with the backup driver (211) for a change, the change indicating a backup event has occurred. When a change in the backup key (213) occurs, the notifying system invokes a setting module (214-5) to set the replica backup key, to indicate the change. The notifying system (210) then invokes a notifying module (214-6) to notify a backup application that the replica backup key (215) is set.

Figure 3:
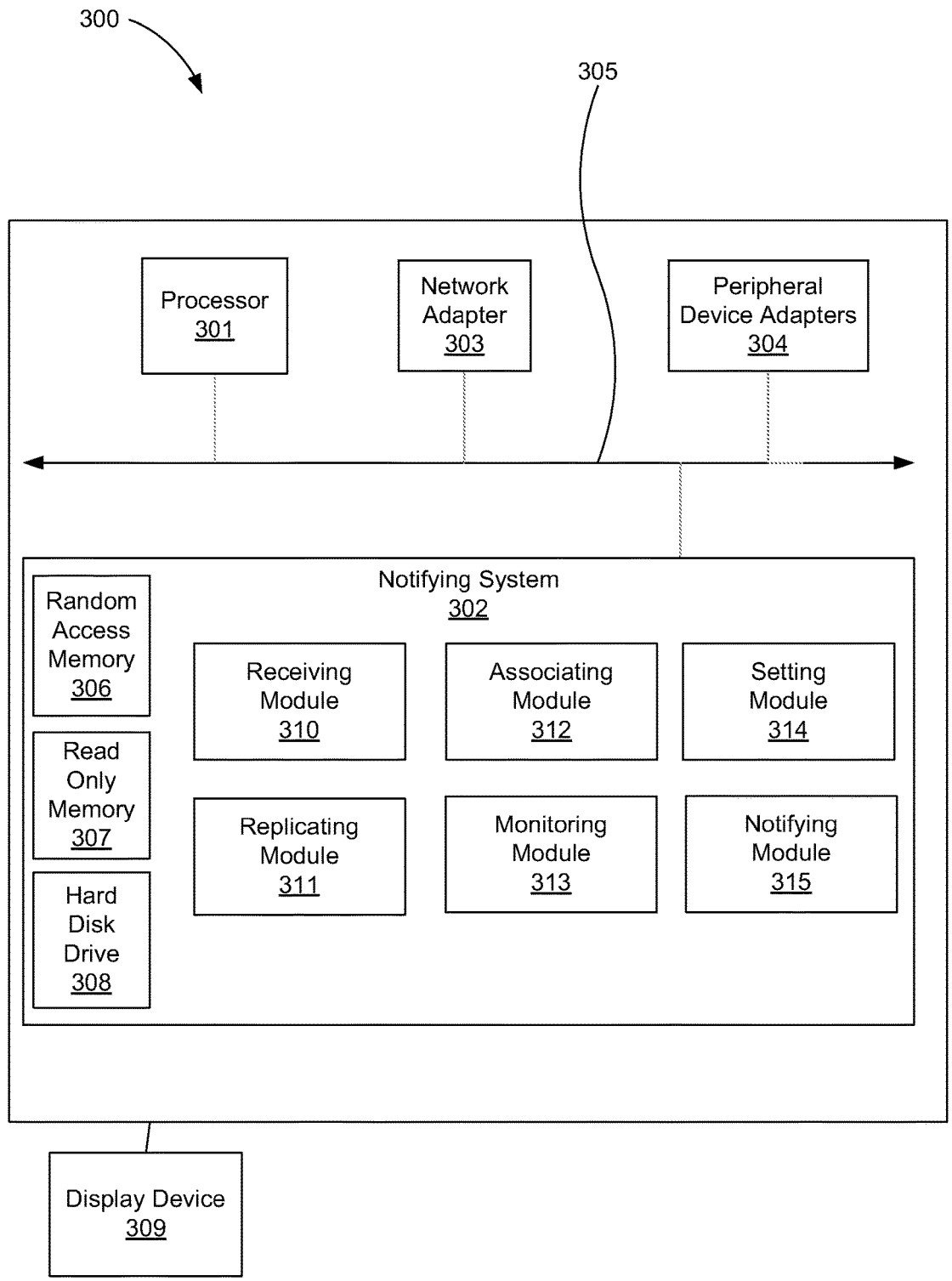
FIG. 3 illustrates a diagram of a computer program product to notify a backup application of a backup key change, according to the principles described herein.

FIG. 3 represents a computing device for supporting multiple backup applications, using a single change tracker, according to one example of the principles described herein. The computing device (300) for managing data in a distributed computing environment may be implemented in an electronic device. Examples of electronic devices include servers, desktop computers, laptop computers, personal digital assistants (PDAs), mobile devices, smartphones, gaming systems, and tablets, among other electronic devices.

The computing device (300) may be utilized in any data-processing scenario, including stand-alone hardware, mobile applications, a computing network, or combinations thereof. Further, the computing device (300) may be used in a computing network, a public cloud network, a private cloud network, a hybrid cloud network, other forms of networks, or combinations thereof. In one example, the methods provided by the computing device (300) are provided as a service over a network by, for example, a third party. In this example, the service may comprise, for example, the following: a Software as a Service (SaaS) hosting a number of applications; a Platform as a Service (PaaS) hosting a computing platform, comprising, for example, operating systems, hardware, and storage, among others; an Infrastructure as a Service (IaaS) hosting equipment such as, for example, servers, storage components, networks, and components, among others; an application program interface (API), or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (300) are executed by a local administrator.

To achieve its desired functionality, the computing device (300) may include various hardware components. Among these hardware components may be a number of processors (301), a number of notifying systems (302), a number of peripheral adapters (304), and a number of network adapters (303). These hardware components may be interconnected through the use of a number of buses and/or network connections. As illustrated, the computing device (300) includes a processor (301), a notifying system (302), peripheral device adapters (304), and a network adapter (303) that is communicatively coupled via a bus (305).

The computing device (300) may include various types of memory modules, including volatile and nonvolatile memory. The notifying system (302) may include Random Access Memory (RAM) (306), Read Only Memory (ROM) (307), and Hard Disk Drive (HDD) memory (308). Many other types of memory may also be utilized, and the present specification contemplates the use of as many varying type(s) of memory in the computing device (300) as may suit a particular application of the principles described herein. Different types of memory in the computing device (300) may be used for different data storage needs. The processor (301) may boot from Read Only Memory (ROM) (307), maintain nonvolatile storage in the Hard Disk Drive (HDD) memory (308), and executable program code stored in Random Access Memory (RAM) (306).

Generally, the computing device (300) may comprise a computer readable medium, a computer readable storage medium, or a non-transitory computer readable medium, among others. The computing device (300) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. A computer readable storage medium may be any non-transitory medium that can contain or store a program for use by, or in connection with, an instruction execution system, apparatus, or device.

The hardware adapters (303, 304) in the computing device (300) enable the processor (301) to interface with various other hardware elements, external and internal to the computing device (300). The peripheral device adapters (304) may provide an interface to input/output devices, such as a display device (309), a mouse, or a keyboard. The peripheral device adapters (303) may also provide access to other external devices, such as an external storage device, a number of network devices, such as servers, switches, and routers, client devices, other types of computing devices, or combinations thereof.

The display device (309) may be provided to allow a user of the computing device (300) to interact with, and implement the functionality of, the computing device (300). The peripheral device adapters (304) may also create an interface between the processor (301) and the display device (309), a printer, or other media output devices. The network adapter (303) may provide an interface to other computing devices within, for example, a network, thereby enabling the transmission of data between the computing device (300) and other devices located within the network.

The notifying system (302) may include a number of modules used in the implementation of the notification of a backup application of a key change. The various modules within the computing device (300) comprise executable program code that may be executed separately. The various modules may be stored as separate computer program products. The various modules within the computing device (300) may be combined within a number of computer program products; each computer program product comprising a number of the modules.

The computing device (300) may include a receiving module (310) which, when executed by the processor, receives a request, from a backup application, to associate with a backup key. The computing device (300) includes a replicating module (311) to replicate a backup key to create a replica backup key. An associating module (312) associates the replica backup key with the backup application. A monitoring module (313) monitors the backup key in the backup driver for a change, the change indicating that a backup event has occurred. A setting module (314) sets the replica backup key to indicate the change. A notifying module (315) notifies the backup application when the replica backup key is set.

The receiving module (310) receives a request, from a backup application, to associate with a backup key, the backup key being associated with a backup driver. The request may include a request for the backup application to be associated with the backup key within a computing device. The backup key may represent an indicator of a backup event that may affect a backup. The backup key may change when a backup event occurs. A backup event may include a system shutdown, a system reboot, a system power failure, a hard disk failure, a file system format, a file system expansion, a file system reduction, or the execution of a file system management command. The receiving module (310) may receive, from a number of different backup applications, a number of requests to associate each of the number of different backup applications with the backup key. The request may include a number of events or changes in the backup key that the backup application is to be notified of when they occur.

The replicating module (311) replicates the backup key to create a replica backup key. The replicating module (311) may create a replica backup key for each of the number of different backup applications. The notifying system (210) may then operate on each of the replica backup keys to support the number of different backup applications.

The associating module (312) associates the replica backup key with the backup application. The association may facilitate the notifying system (302) supporting a number of different backup applications, and tracking the activity of the backup application with respect to the backup key. The association may facilitate the notifying system (310) updating the replica backup key and notifying the backup application.

The monitoring module (313) monitors the backup key, the backup key being associated with the backup driver for a change, the change indicating a backup event has occurred. The monitoring module (313) may query a backup driver to read the backup key. The monitoring module (313) may receive a notification from the backup driver. The monitoring module (313) may register a request to receive the notification from the backup driver.

The setting module (314) sets the replica backup key to indicate that a change to the backup key has occurred. Setting the replica backup key may include setting an action that is to be invoked by the backup application. The setting module (314) may set information about the change to the backup key, such as the nature of the event that caused the change to the backup key.

The notifying module (315) notifies the backup application when the replica backup key is set. The backup application may, in the request to associate with a backup key, specify a number of backup events to be notified of when the backup events occur. The backup application may be notified of all changes to the backup key. The notification of the backup application may occur by invoking an action handler for the backup application.

Aspects of the present system and method are described herein with reference to flowchart illustrations and/or block diagrams of methods, apparatus (systems) and computer program products, according to examples of the principles described herein. Each block of the flowchart illustrations and block diagrams, and combination of blocks in the flowchart illustrations and block diagrams, may be implemented by computer usable program code. The computer usable program code may be provided to a processor of a general purpose computer, special purpose computer, or other programmable data processing apparatus, to produce a machine, such that the computer usable program code, when executed via, for example, the processor (301) of the computing device (300) or other programmable data processing apparatus, implements the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Figure 4:
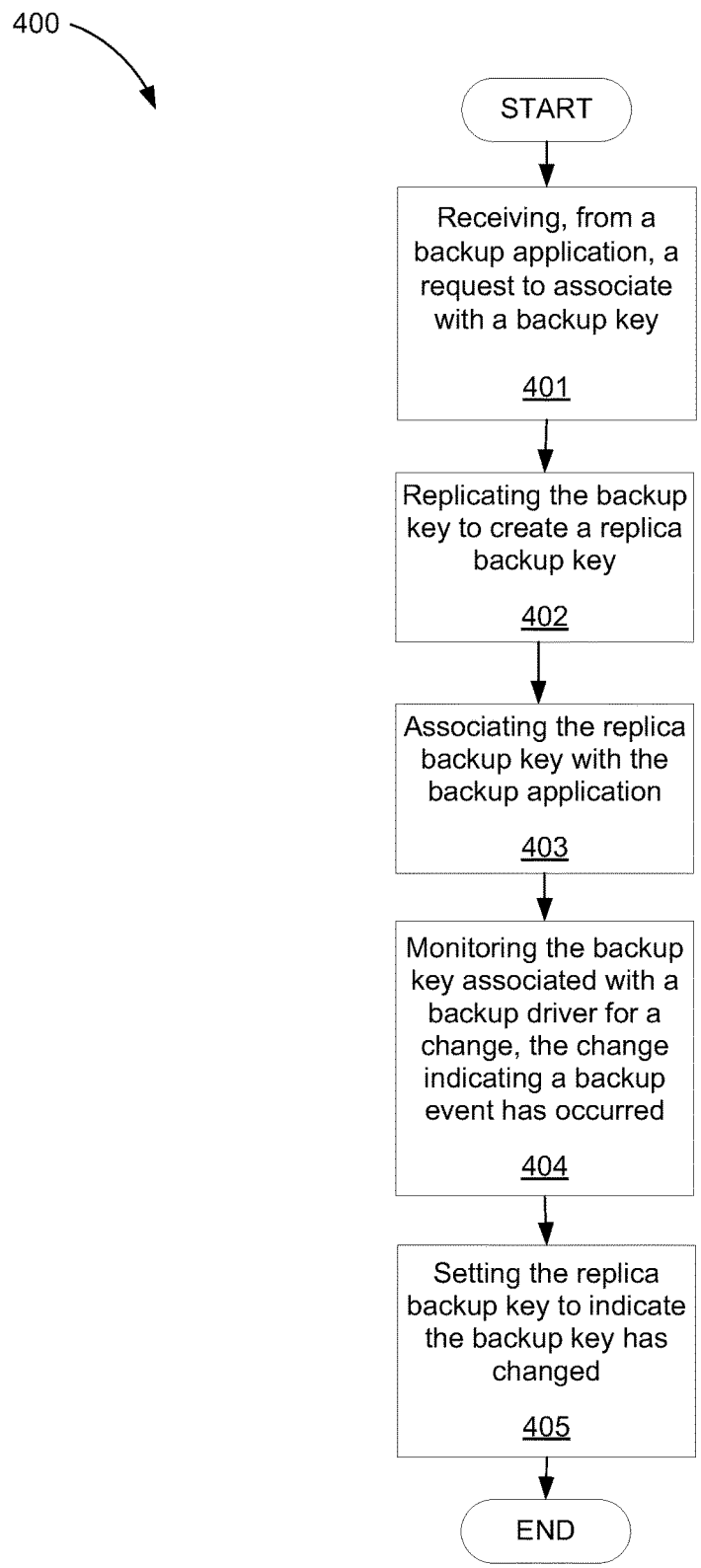
FIG. 4 illustrates a flowchart of a method implemented by a backup server for notifying a backup application of a backup key change, according to one example of principles described herein.

FIG. 4 is a flow chart of a method for notifying a backup application of a backup key change, according to one example of principles described herein. The method (400) may be executed by the notifying system of FIG. 1. The method (400) may be executed by other systems (i.e. system 200, system 300, and system 800). As illustrated, the method (400) includes receiving (401), from a backup application, a request to associate with a backup key, the backup key being associated with a backup driver, replicating (402) the backup key to create a replica backup key, associating (403) the replica backup key with the backup application, monitoring (404) the backup key for a change, the change indicating a backup event has occurred, and setting (405) the replica backup key when the backup event occurs.

As mentioned above, the method (400) includes receiving (401) from a backup application, a request to associate with a backup key. The receiving (401) may receive the request from the backup application (FIG. 2, 202). The request may include identification of the computing device (FIG. 2, 212). The request may include identification of backup events that, when they occur, result in the backup application being notified. The request may identify an action to be invoked when the event occurs. The receiving (401) may receive a number of requests from a number of different backup applications to associate with the backup key. The backup key may include a list of backup events that affect the backup.

As mentioned above, the method (400) includes replicating (402) the backup key to create a replica backup key. The replicating (402) replicates the data stored in the backup key. The replicating (402) may store a combination of information from the backup key and the request. The replicating may alter the structure of the data in the backup key when creating the replica backup key. The replicating (402) may replicate additional data to be used when the backup application is notified of the backup event.

As mentioned above, the method (400) includes associating (403) the replica backup key with the backup application. The associating (403) may associate a number of different replica backup keys with a number of different backup applications.

As mentioned above, the method (400) includes monitoring (404) the backup key for a change, the change indicating a backup event has occurred. The monitoring (404) may include monitoring the backup key for a change within the computing device. The monitoring (404) may include monitoring for events that affect the backup state. The monitoring (404) may monitor for a system shutdown, a system reboot, a system power failure, a hard disk failure, a file system format, a file system expansion, a file system reduction, or the execution of a file system management command.

As mentioned above, the method (400) includes setting (405) the replica backup key when the backup event occurs. The setting (405) may include creating a list of events that affect the backup key. The value of the replica backup key may be retrieved by the backup application.

As mentioned above, the method (400) includes receiving (401), from a backup application, a request to associate with the backup key. The backup application may be a process on the computing device (FIG. 2, 212). The backup application may reside on a separate computing device. The request may be included as part of a registration with a notifying system (FIG. 2, 210). The receiving module (401) may receive a number of requests to associate each of the number of backup applications with the backup key.

Figure 5:
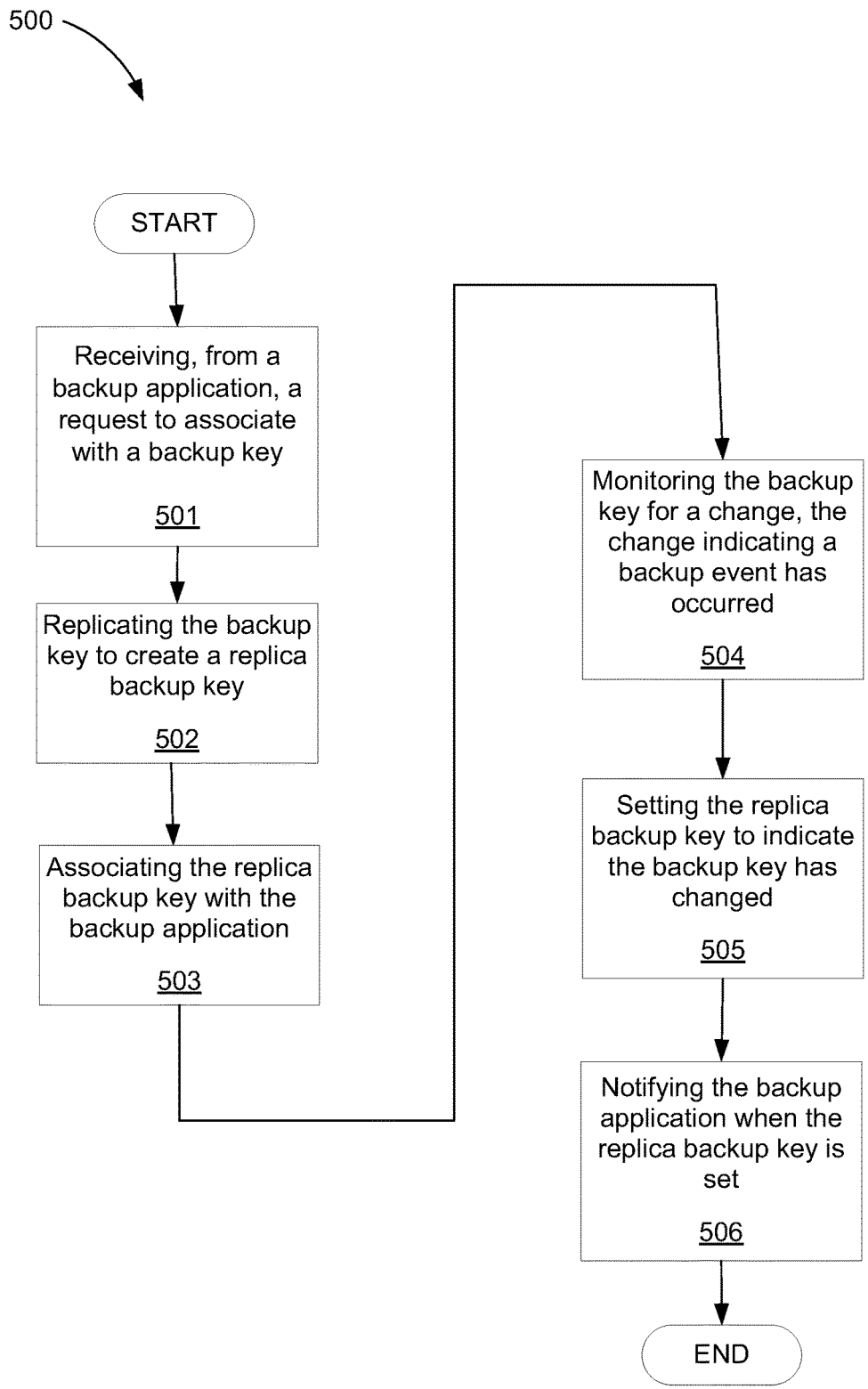
FIG. 5 illustrates a flowchart of a method implemented by a backup server for notifying a backup application of a backup key change, according to one example of principles described herein.

FIG. 5 is a flow chart of a method for notifying a backup application of a change to a backup key, according to one example of principles described herein. The method (500) may be exectuted by the notifying system of FIG. 1. The method (500) may be executed by other systems (i.e. system 200, system 300, and system 800). As illustrated, the method (500) includes receiving (501), from a backup application, a request to associate with a backup key; the backup key being associated with a backup driver, replicating (502) the backup key to create a replica backup key, associating (503) the replica backup key with the backup application, monitoring (504) the backup key for a change, the change indicating a backup event has occurred, setting (505) the replica backup key when the backup event occurs, and notifying (506) the application when the replica backup key is set.

As mentioned above, the method (500) includes notifying (506) the backup application when the replica backup key is set. The backup application may be notified by invoking a predetermined action handler. The backup application may be notified by invoking computer code specified by the backup application. The notifying (506) may inform the backup application of a preferred backup action to invoke to handle the backup event. The notifying (506) may provide the backup application with information about the backup event.

Figure 6:
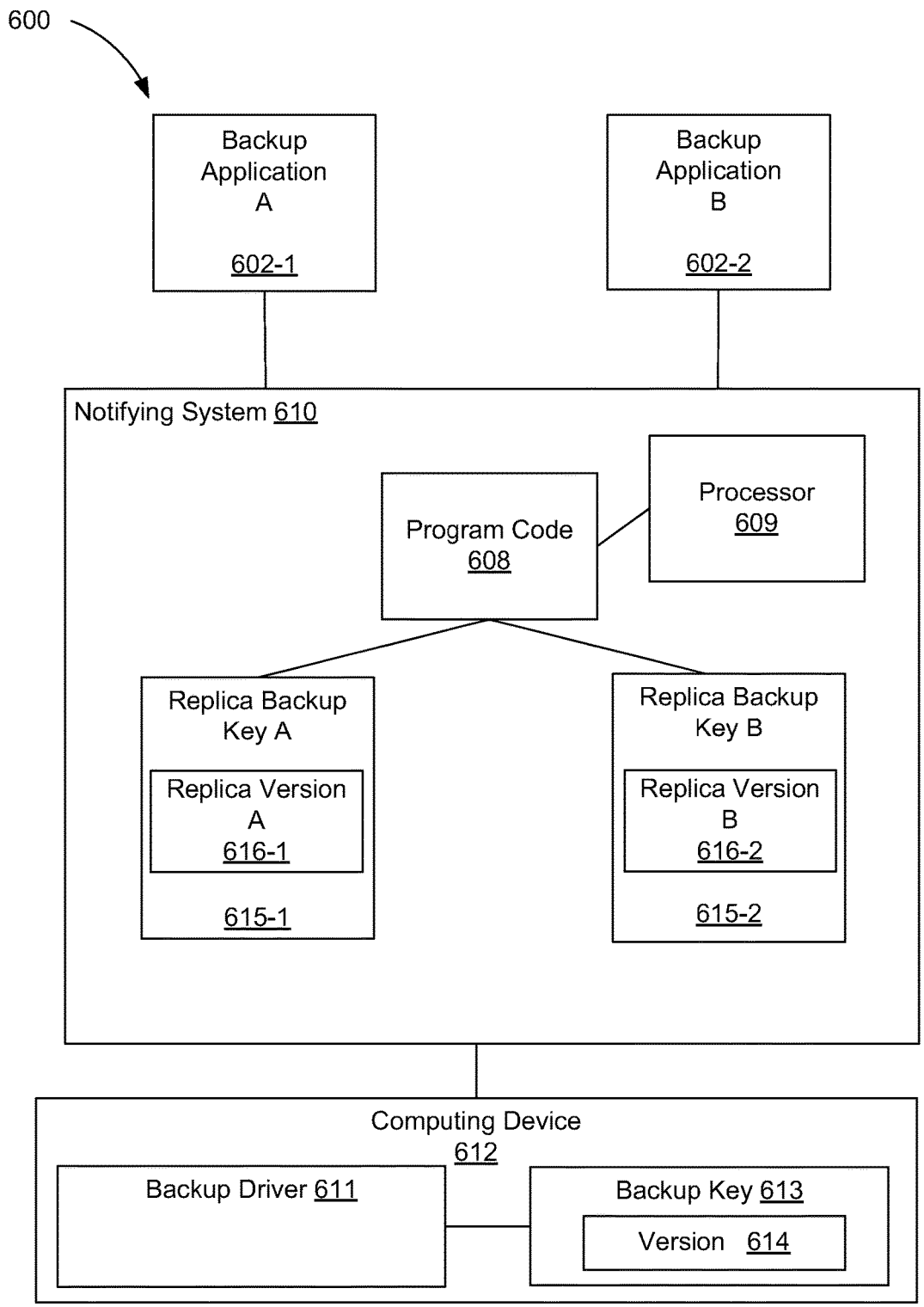
FIG. 6 illustrates a diagram of a backup system, according to one example of principles described herein.

FIG. 6 is a diagram of a system for notifying a number of different backup applications of a backup key change, according to one example of the principles described herein. As will be described below, the notifying system is in communication with a computer device with data to back up. The notifying system receives, from a number of different backup applications, requests to associate with a backup key, the backup key being associated with a backup driver. The notifying system replicates the backup key to create a number of replica backup keys. The notifying system associates each of the number of replica backup keys with each of the number of different backup applications. The notifying system monitors the backup key for a change, the change indicating a backup event has occurred. The notifying system sets the number of replica backup keys to indicate the change. The notifying system notifies each of the number of different backup applications when the replica backup key is set.

As illustrated in FIG. 6, the system (600) includes a computing device (612). The computing device (612) may be a data storage server, an email server, a personal computer, or another system that has data associated with it. The computing device (612) represents a computer system that stores data that may be backed up. The computing device (612) may include a backup driver (611) to provide an interface to back up data stored on the computing device (612). The backup driver (611) may provide an interface to monitor changes in a backup key (613).

The system (600) includes a number of backup applications (601-1, 601-2). The notifying system (610) includes program code (608) that, when executed on the processor (609), receives a request from each of the number of different applications (601-1, 601-2) to associate with a backup key (613), the backup key (613) being associated with a backup driver (611).

The program code (608), when executed on the processor (609), replicates the backup key (613). The program code (608) may allocate a replica backup key (615) for each of the number of different backup applications (601). The replica backup keys (615) may be used by the notifying system (610) to monitor notification to a backup application (601) of changes to the backup key (613).

The program code (608), when executed on the processor (609), associates the replica backup keys (615) with each of the number of different backup applications (601). Backup application A (601-1) is associated with replica backup key A (615-1). The notifying system (610) may use the association of backup application A (601-1) with replica backup key A (615-1) to notify backup application A (601-1) of changes in the computing device (612). Backup application B (601-2) is associated with replica backup key B (615-2). The notifying system (610) may use the association of backup application B (601-2) with replica backup key B (615-2) to notify backup application B (601-2) of changes in the computing device (613).

The program code (608), when executed on the processor (609), monitors the backup key (613) for a change, the change indicating a backup event has occurred. The monitoring may monitor an event version (614) in the backup key. When an event occurs, the event may include changing the version (614) to indicate that the event has occurred. The version (614) may be an integer value, the integer value being increased at the occurrence of each backup event. The version (614) may include a list of backup events. The comparison of elements on the list with a replica list may indicate that a backup event has occurred. The notifying system (610) may use additional data or structures to determine a change in the backup key (613).

The program code (608), when executed on the processor (609), sets the replica backup key (615) when the backup event occurs. When the monitoring determines there has been a change in the backup key (613), the notifying system (610) may set replica backup key A (615-1) to communicate with backup application A (601-1), and/or the notifying system (610) may set replica backup key B (615-2) to communicate with backup application B (601-2). The notifying system (610) may set a replica version A (616-1) in the replica backup key A (615-1) to the value of the version (614) in the backup state (613). The notifying system (610) may set a replica version B (616-2) in the replica backup key B (615-2) to the value of the version (614) in the backup key (613).

The program code (608), when executed on the processor (609), may notify a number of different applications (601) of the change to the backup key (613). The notifying system (610) may notify backup application A (601-1) of a change to replica backup key A (615-1). The notifying system may notify backup application B (601-2) of a change to replica backup key B (615-2).

Figure 7:
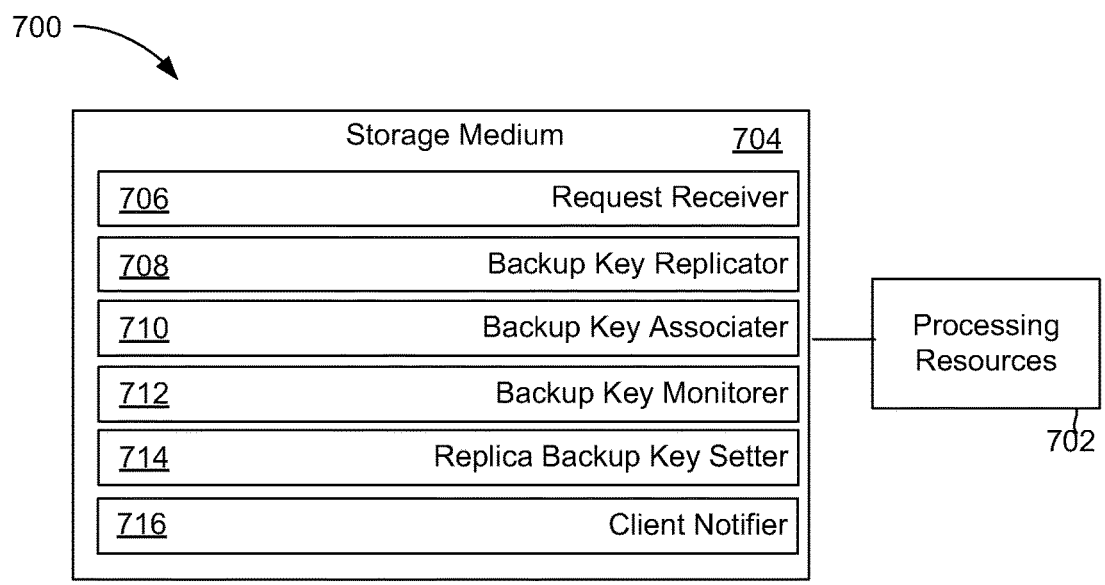
FIG. 7 illustrates a diagram of a system for notifying a backup application of a backup key change, according to the principles described herein.

FIG. 7 is a diagram of an example of a notifying system (700), according to one example of the principles described herein. The notifying system (700) includes processing resources (702) that are in communication with memory resources (704). The processing resources (702) include at least one processor, and other resources used to process programmed instructions. The memory resources (704) generally represent any memory capable of storing data, such as programmed instructions or data structures to be used by the notifying system (700). The programmed instructions shown stored in the memory resource (704) include a request receiver (706), a backup key replicator (708), a backup key associater (710), a backup key monitor (712), a replica backup key setter (714), and a backup application notifier (716).

The request receiver (706) represents programmed instructions that, when executed, cause the processing resource (702) to receive, from a backup application, a request to associate with a backup key tracker, the backup key tracker being associated with a backup driver. The application may be a process on the same computing device as the notifying system (700), or may be received over a network by the notifying system (700). The request may include information about backup events of which a backup application requests notification.

The backup key replicator (708) represents programmed instructions that, when executed, cause the processing resource (702) to replicate a backup key tracker to create a replica backup key tracker. The backup key replicator (708) may replicate values in the backup key tracker. The replica backup key tracker may store the same data as the backup key tracker. The replica backup key tracker may store data in addition to the data stored in the backup key tracker. The replica backup key tracker may omit data that is stored in the backup key tracker.

The backup key associater (710) represents programmed instructions that, when executed, cause the processing resource (702) to associate the replica backup key tracker with the backup application. The replica backup key tracker may be referenced by the notifying system and the backup application.

The backup key monitor (712) represents programmed instructions that, when executed, cause the processing resource (702) to monitor the backup key tracker for a change, the change indicating a backup event has occurred. The backup key monitor (712) may monitor a version of backup events in the backup key tracker. The backup key monitor (712) may monitor a data structure, such as a list, for changes about which the backup application should receive notification.

The replica backup key setter (714) represents programmed instructions that, when executed, cause the processing resource (702) to set the replica backup key tracker when the backup event has occurred. The replica backup key setter (714) may set information for the backup application, to indicate a recommended action to take in response to the backup event.

The backup application notifier (716) represents programmed instructions that, when executed, cause the processing resource (702) to notify the backup application when the backup key tracker is set. The backup application notifier (716) may invoke code specified by the backup application to handle the backup event. The backup application notifier (716) may notify the backup application that the replica backup key tracker has changed, and the backup application may read the replica backup key tracker from the notifying system (700).

The flowchart and block diagrams in the Figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and each combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicates otherwise. It will be further understood that the terms "comprises" and/or "comprising," when used in the specification, specify the presence of stated features, integers, operations, elements, and/or components, but do not preclude the presence or addition of a number of other features, integers, operations, elements, components, and/or groups thereof.

What is claimed is:

1. A computer implemented method to notify a backup application of a backup key change, the method comprising, with a processor:
   receiving, from a number of different backup applications, a number of requests to associate each of the number of different backup applications with a backup key, the requests including a number of events or changes in the backup key that the backup application is to be notified of when they occur, wherein the backup key: indicates a backup is to be performed; and comprises a list of backup events that affect the backup; replicating the backup key to create a replica backup key for each of the number of different backup applications; associating the replica backup key with the backup application; monitoring the backup key for a change, the change indicating a backup event has occurred; and setting the replica backup key to indicate the backup key has changed, wherein the backup key indicates both hardware backup events and file backup events.

2. The method of claim 1, wherein a backup event comprises a backup event on a computing device being backed up.

3. The method of claim 1, wherein monitoring the backup key for a change further comprises receiving a notice from a backup driver that the backup key has changed.

4. The method of claim 1, further comprising notifying the backup application when the replica backup key is set.

5. The method of claim 1, wherein:
   a hardware backup event is any one of: a system shutdown, a system reboot, a system power failure, and a hard disk failure; and
   a file backup event is any one of: a file system format, a file system expansion, a file system reduction, and an execution of a file system management command.

6. The method of claim 1, wherein the backup key indicates that multiple events that affect a backup have occurred.

7. The method of claim 1, wherein setting the replica backup key further comprises setting a backup action for the backup application to invoke.

8. A data backup system comprising: at least one backup application associated with a backup server to: manage a backup data set stored on a backup data storage device; and perform a backup operation based on a change to a backup key, wherein the backup key comprises a list of backup events that affect a backup; a supporting system which comprises a processor, wherein the supporting system, through the processor, notifies the at least one backup application when a backup key at least one backup driver to communicate with the at least one backup application through the supporting system
   wherein the supporting system further comprises: computer program code stored in a memory, the memory communicatively coupled to the processor, the computer program code comprising instructions to: receive, from a number of different backup applications, a number of requests to associate each of the number of different backup applications with a backup key, the requests including a number of events or changes in the backup key that the backup application is to be notified of when they occur; replicate the backup key to create a replica backup key for each of the number of different backup applications; associate the replica backup key with the backup application; monitor the backup key for a change, the change indicating a backup event has occurred; set the replica backup key to indicate the change in the backup key; and notify the backup application when the replica backup key is set.

9. The system of claim 8, wherein monitoring the backup key for a change comprises receiving a notice that the backup key has changed.

10. The system of claim 8, wherein a backup event is any one of: a system shutdown, a system reboot, a system power failure, a hard disk failure, a file system format, a file system expansion, a file system reduction, and an execution of a file system management command.

11. The system of claim 10, wherein the backup key includes information pertaining to multiple backup events.

12. The system of claim 8, wherein setting the replica backup key to indicate the change in the backup key further comprises setting a backup action for the backup application to perform.

13. A computer program product to notify a backup application of a backup key change comprising a non-transitory machine-readable storage medium encoded with instructions, the instructions executable by a processor of a system to cause the system to: receive, from multiple different backup applications, a number of requests to associate with a backup key, which request indicates: an identification of backup events that, when they occur, result in a backup application being notified; a number of backup events; and an action to be invoked when a backup event occurs; wherein the backup key: indicates a backup is to be performed; comprises information about changes to the computing device that affect a backup; and comprises an integer value that is increased when a backup event occurs; replicate the backup key to create a replica backup key for each of the multiple different backup applications that has requested to be associated with the backup key, which replica backup key tracks changes to the backup key; associate the replica backup key with the backup application; monitor the backup key for a change, the change indicating a backup event, comprising a system reboot, has occurred; and change the replica backup key based on a change to the backup key.

14. The computer program product of claim 13, wherein the backup key indicates an event has occurred on a backup server.

15. The computer program product of claim 13, wherein monitoring the backup key for a change comprises receiving a notice that the backup key has changed.

16. The computer program product of claim 13, further comprising instructions executable by the processor of the system, to cause the system to notify the backup application when the replica backup key indicates a change.

17. The computer program product of claim 13, wherein a backup event is any one of: a system shutdown, a system power failure, a hard disk failure, a file system format, a file system expansion, a file system reduction, and an execution of a file system management command.

18. The computer program product of claim 17, in which the backup key tracks multiple events that have occurred that affect backup operations.

19. The computer program product of claim 13, in which setting the replica backup key to indicate the event has occurred further comprises setting a backup action to be invoked by a backup application.

\* \* \* \* \*